(12) United States Patent
Miyamoto

(10) Patent No.: US 7,234,151 B2
(45) Date of Patent: Jun. 19, 2007

(54) DISK PLAYER

(75) Inventor: Takashi Miyamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 495 days.

(21) Appl. No.: 10/850,380

(22) Filed: May 21, 2004

(65) Prior Publication Data

US 2004/0246828 A1    Dec. 9, 2004

(30) Foreign Application Priority Data

May 22, 2003    (JP) .................... 2003-002906 U

(51) Int. Cl.
*G11B 17/04*    (2006.01)
(52) U.S. Cl. .................................. 720/609
(58) Field of Classification Search ............... 720/601, 720/609
See application file for complete search history.

(56) References Cited

U.S. PATENT DOCUMENTS 6,005,833 A * 12/1999 Yasuma et al. ............. 720/602
6,208,606 B1 * 3/2001 Saito ........................... 720/609
6,266,311 B1 * 7/2001 Song et al. .................. 720/609

FOREIGN PATENT DOCUMENTS

| JP | 07240053 A | * | 9/1995 |
| JP | 08007432 A | * | 1/1996 |
| JP | 09027181 A | * | 1/1997 |
| JP | 2001184764 A | * | 7/2001 |
| JP | A-2002-100096 | | 4/2002 |

* cited by examiner

*Primary Examiner*—William J. Klimowicz
(74) *Attorney, Agent, or Firm*—Morgan, Lewis & Bockius LLP

(57) ABSTRACT

A touching plate of the emergency mechanism, which is located near the front panel of a casing, is rotatably pivoted, an arm is protruded from the touching plate so that it is opposite to a lever protruded from the end of a slide bar, a nozzle having a prescribed length, which is located near the thin rod contact face of the touching plate, is protruded concentrically to a through-hole integrally from the inner face of the front panel, the thin rod passed through the through-hole is guided by the nozzle so that the tip of the thin rod is brought into contact with the thin rod contact face of the touching plate. In this way, by pushing in the touching plate about the pivoting shaft, the slide bar is slid through the arm and lever, thereby slightly moving the tray forward.

3 Claims, 13 Drawing Sheets

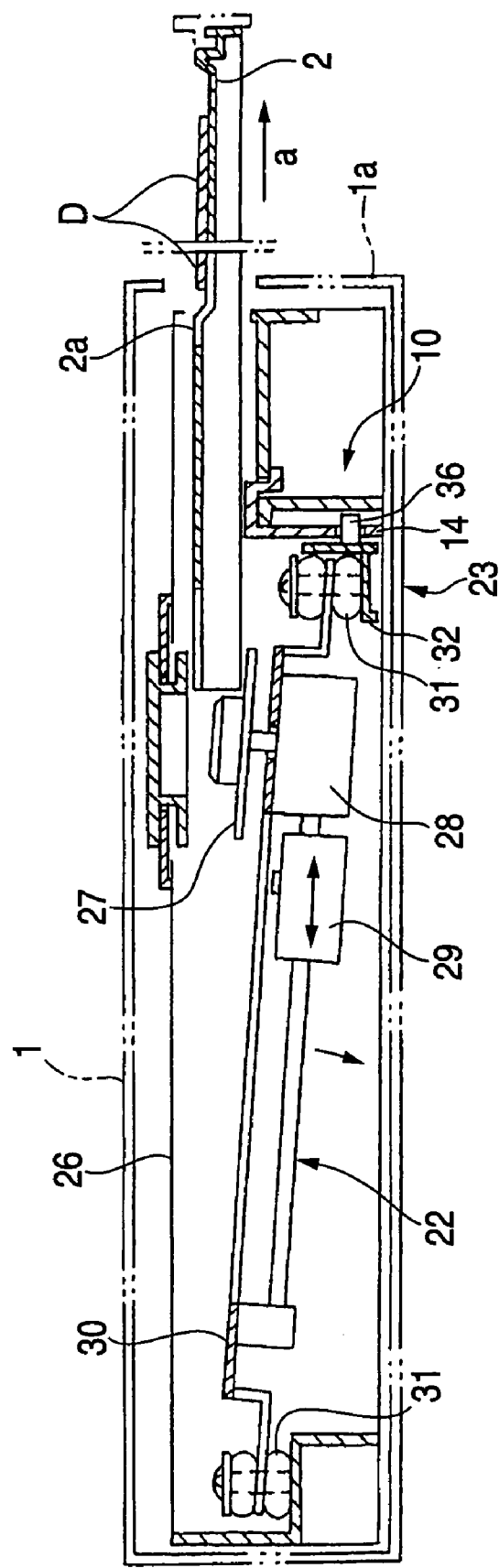

PRIOR ART

DISK PLAYER

BACKGROUND OF THE INVENTION

1. Field of the Invention

The present invention relates to a disk player for performing reproduction, recording or erasure for an optical disk such as DVD/RW and magnetic disk (hereinafter referred to as "disk").

2. Description of the Related Art

An example of the disk player is shown in FIG. 12. In this disk player, a tray 2 is housed within a casing 1 so that it is movable forward/backward in a direction of arrow a–b. The front panel 1a of the casing 1 is provided with a pressing button 3 for loading, a through-hole 4 for an emergency mechanism, an operating display lamp 5, a volume knob 6 and a plug 7 for a headphone.

In the above configuration, starting from the state where the tray 2 has been housed within the casing 1, by pressing the pressing button 3, the tray 2 is moved forward "a" (see phantom line in FIG. 12) in response to an unloading signal, and after a disk D (FIG. 3) has been placed on the tray 2, by pressing the pressing button 3, the tray 2 is moved backward "b" in response to a loading signal.

In the above configuration, if the tray 2 cannot be moved forward "a" even when the pressing button 3 has been pressed, a thin rod is passed through the through-hole 4 to manipulate an emergency mechanism 9 (described later). Thereby, the tray 2 may be slightly moved forward "a" and the front end of the tray 2 may be pulled out by a finger.

Conventionally, an exemplary technique of the emergency mechanism has been disclosed in JP-A-2002-100096. In this technique, as shown in FIGS. 13 to 15, the emergency mechanism 9 is incorporated in a tray driving device 10 for moving the tray forward "a" and backward "b".

The tray driving device 10 includes a gear mechanism 13 provided on the front portion of the casing 1 oppositely to a rack 12 (see FIG. 3) provided on the lower surface of the tray 2, a slide bar 14 which is slidably arranged on the front portion of the casing 1 along a transverse direction "c"–"d" orthogonal to the forward/backward movement direction "a"–"b", a guide pin 16 projecting from the slide bar 14 and fitting in a guide groove 15 formed in the lower surface of the tray 2 and a tooth portion 14a formed integrally to the slide bar 14 so as to be engageable/disengageable with the gear mechanism 13.

The emergency mechanism 9 has a touching plate 18 formed integrally to the lower surface of a gear constituting the gear mechanism 13, and a guiding plate 19 is arranged to extend from the vicinity of a through-hole 4 to a thin rod contact plane 18a of the touching plate 18.

In the above configuration, the thin rod 8 passed through the through-hole 4 is guided by the guiding plate so that the tip of the thin rod 8 is brought into contact with the thin-rod contact plane of the touching plate 18, and by pushing in the touching plate, the slide bar 14 is slid in a direction of arrow "d", through the gear mechanism 13 and the tooth portion. Further, by pressing the slanted inner face 15a of the guide groove 15 using the guide pin 16, the tray is slightly moved forward "a" (see phantom line in FIGS. 13 and 14). The front end of the tray 2 is pulled out by a finger.

In the above configuration, as shown in FIG. 15, the touching plate 18 is incorporated into the gear mechanism 13. The distance L from the thin-rod contact face 18a of the touching plate 18 to the through-hole 4 is relatively large whereas the longitudinal width h of the thin-rod contact face is small (e.g. 1–2 mm). In this case, in order that the tip of the thin rod 8 passed into the through-hole 4 does not come off from the thin rod contact face 18a, the guide plate 19 is employed. This increases the number of components by the degree of using the guiding plate 19, thereby increasing the production cost.

It can be proposed to increase the longitudinal width of the thin rod contact face 18a to about 6 mm. However, this increases the height of the gear mechanism 13, which incorporates the touching plate 18, by the degree of increasing the longitudinal width h, thereby upsizing the casing 1. As a result, actually, the longitudinal width h of the thin rod contact face 18a cannot be increased.

The thin rod 8 is generally formed of a stationary clip made of soft iron and extended linearly so that it is likely to be bent.

Further, since the outer diameter e is small e.g. 8 mm, the tip of the thin rod 8 may enter the gap $\alpha$ between the touching plate 18 and the guiding plate 19 as shown in FIG. 16. These inconveniences hinder the emergency mechanism 9 from operating effectively.

SUMMARY OF THE INVENTION

In view of these inconveniences, an object of the present invention is to provide a disk player which can be downsized without increasing the number of components so that an emergency mechanism can be surely operated.

In order to attain the above object, the invention described in a first aspect is a disk player including:

a tray driving device for moving a tray placed in a casing forward/backward; and an emergency mechanism for slightly moving the tray forward by a manual operation using a thin rod; the tray driving device including a gear mechanism provided on the front portion of the casing oppositely to a rack provided on the lower surface of the tray, a slide bar arranged, on the front portion of the casing, slidably in a transverse direction orthogonal to the direction of moving the tray forward/backward, a guide pin projecting from the slide bar and fitting in a guide groove formed in the lower surface of the tray, and a tooth portion formed integrally to the slide bar so as to be engageable/disengageable with the gear mechanism, wherein the gear mechanism is driven on the basis of an unloading signal so that the slide bar is slid through the tooth portion engaged with the gear mechanism in a prescribed direction, and by pushing the slanted inner face of the guide groove using the guide pin, the tray is slightly moved forward so that the rack is engaged with the gear mechanism and the tooth portion is disengaged from the gear portion, thereby moving the tray forward through driving of the gear mechanism; the emergency mechanism including a touching plate incorporated in the gear mechanism, a through-hole made, oppositely to the touching plate, in the front panel of the casing, and a guide plate extending from the vicinity of the through-hole to the touching plate, wherein the thin rod passed through the through-hole is guided by the guide plate so that the thin rod is brought into contact with a thin rod contact face of the touching plate, and by pushing in the touching plate, the slide bar is slid in the prescribed direction through the gear mechanism and tooth portion, thereby slightly moving the tray forward; wherein the touching plate of the emergency mechanism is extracted from the gear mechanism, located near the front panel of a casing and rotatably pivoted about a pivoting axis on the casing; the longitudinal width and transverse width of the thin rod contact face of the touching plate are set at the magnitudes five times larger than the external diameter of the thin rod; an arm is protruded from the touching plate so as to be opposite to a lever protruded from the end of the slide bar; a nozzle is arranged in place of the guide plate to be near the thin rod contact face of the touching plate, the nozzle being protruded concentrically to the through-hole, integrally protruded from the inner face of the front panel, the nozzle having a prescribed length; and the thin rod passed through the through-hole is guided by the nozzle so that the tip of the thin rod is brought into contact with the thin rod contact face of the touching plate, and by pushing in the touching plate about the pivoting shaft, the slide bar is slid in the prescribed direction through the arm and lever, thereby slightly moving the tray forward.

The above configuration corresponds to an embodiment of the invention (see FIGS. 1 to 11). In accordance with this configuration, since the touching plate of the emergency mechanism is arranged near the front panel of the casing so that the distance from the through-hole in the front panel to the thin rod contact face of the touching plate is short, the tip of the thin rod passed through the through-hole can be accurately opposed to the thin rod contact face. In addition, since the nozzle having a prescribed length which is located near the thin rod contact face is protruded, concentrically to the through-hole, integrally from the inner face of the front panel, the thin rod passed through the through-hole can be guided by the nozzle so that it is surely brought into contact with the thin rod contact face of the touching plate. Thus, the emergency mechanism can be smoothly operated to move the tray forward "a" slightly. In this case, since the nozzle is protruded integrally from the front panel, the number of components is not increased, thereby reducing the production cost as compared with the case of using the conventional guiding plate.

Since the touching plate is located in a relatively wide space apart from the gear mechanism so that the longitudinal width and transverse width of the thin rod contact face are set at the magnitudes five times larger than the external diameter e of the thin rod, even if the direction of the tip of the thin rod gone out from the nozzle is slightly changed, the tip of the thin rod can be surely brought into contact with the thin rod contact face.

The invention described in a second aspect is a disk player including: a tray driving device for moving a tray placed in a casing forward/backward; and an emergency mechanism for slightly moving the tray forward by a manual operation using a thin rod; the tray driving device including a gear mechanism provided on the front portion of the casing oppositely to a rack provided on the lower surface of the tray, a slide bar arranged, on the front portion of the casing, slidably in a transverse direction orthogonal to the direction of moving the tray forward/backward, a guide pin projecting from the slide bar and fitting in a guide groove formed in the lower surface of the tray, and a tooth portion formed integrally to the slide bar so as to be engageable/disengageable with the gear mechanism, wherein the gear mechanism is driven on the basis of an unloading signal so that the slide bar is slid through the tooth portion engaged with the gear mechanism in a prescribed direction, and by pushing the slanted inner face of the guide groove using the guide pin, the tray is slightly moved forward so that the rack is engaged with the gear mechanism and the tooth portion is disengaged from the gear portion, thereby moving the tray forward through driving of the gear mechanism, wherein the emergency mechanism includes a touching plate touching plate located near the front panel of the casing and rotatably pivoted on a pivoting axis to the casing; an arm is protruded from the touching plate so as to be opposite to a lever protruded from the end of the slide bar; a nozzle is arranged in place of the guide plate to be near a thin rod contact face of the touching plate, the nozzle being protruded concentrically to the through-hole, integrally protruded from the inner face of the front panel, the nozzle having a prescribed length; and the thin rod passed through the through-hole is guided by the nozzle so that the tip of the thin rod is brought into contact with the thin rod contact face of the touching plate, and by pushing in the touching plate about the pivoting shaft, the slide bar is slid in the prescribed direction through the arm and lever, thereby slightly moving the tray forward.

In accordance with the above configuration, since the touching plate of the emergency mechanism is arranged near the front panel of the casing so that the distance from the through-hole in the front panel to the thin rod contact face of the touching plate is short, the tip of the thin rod passed through the through-hole can be accurately opposed to the thin rod contact face. In addition, since the nozzle having a prescribed length which is located near the thin rod contact face is protruded, concentrically to the through-hole, integrally from the inner face of the front panel, the thin rod passed through the through-hole can be guided by the nozzle so that it is surely brought into contact with the thin rod contact face of the touching plate. Thus, the emergency mechanism can be smoothly operated to move the tray forward lightly. In this case, since the nozzle is protruded integrally from the front panel, the number of components is not increased, thereby reducing the production cost as compared with the case of using the conventional guiding plate.

The invention described in a third aspect is a disk player according to the second aspect, characterized in that the longitudinal width and transverse width of the thin rod contact face of the touching plate are set at the magnitudes five times larger than the external diameter of the thin rod.

In accordance with the above configuration, since the touching plate is located in a relatively wide space apart from the gear mechanism so that the longitudinal width and transverse width of the thin rod contact face are set at the magnitudes five times larger than the external diameter e of the thin rod, even if the direction of the tip of the thin rod gone out from the nozzle is slightly changed, the tip of the thin rod can be surely brought into contact with the thin rod contact face.

BRIEF DESCRIPTION OF THE DRAWINGS

These and other objects and advantages of this invention will become more fully apparent from the following detailed description taken with the accompanying drawings in which:

FIG. 6 is a partial plan view of the unloading state of the disk player according to an embodiment of this invention;

DETAILED DESCRIPTION OF THE PREFERRED EMBODIMENTS

Figure 1:
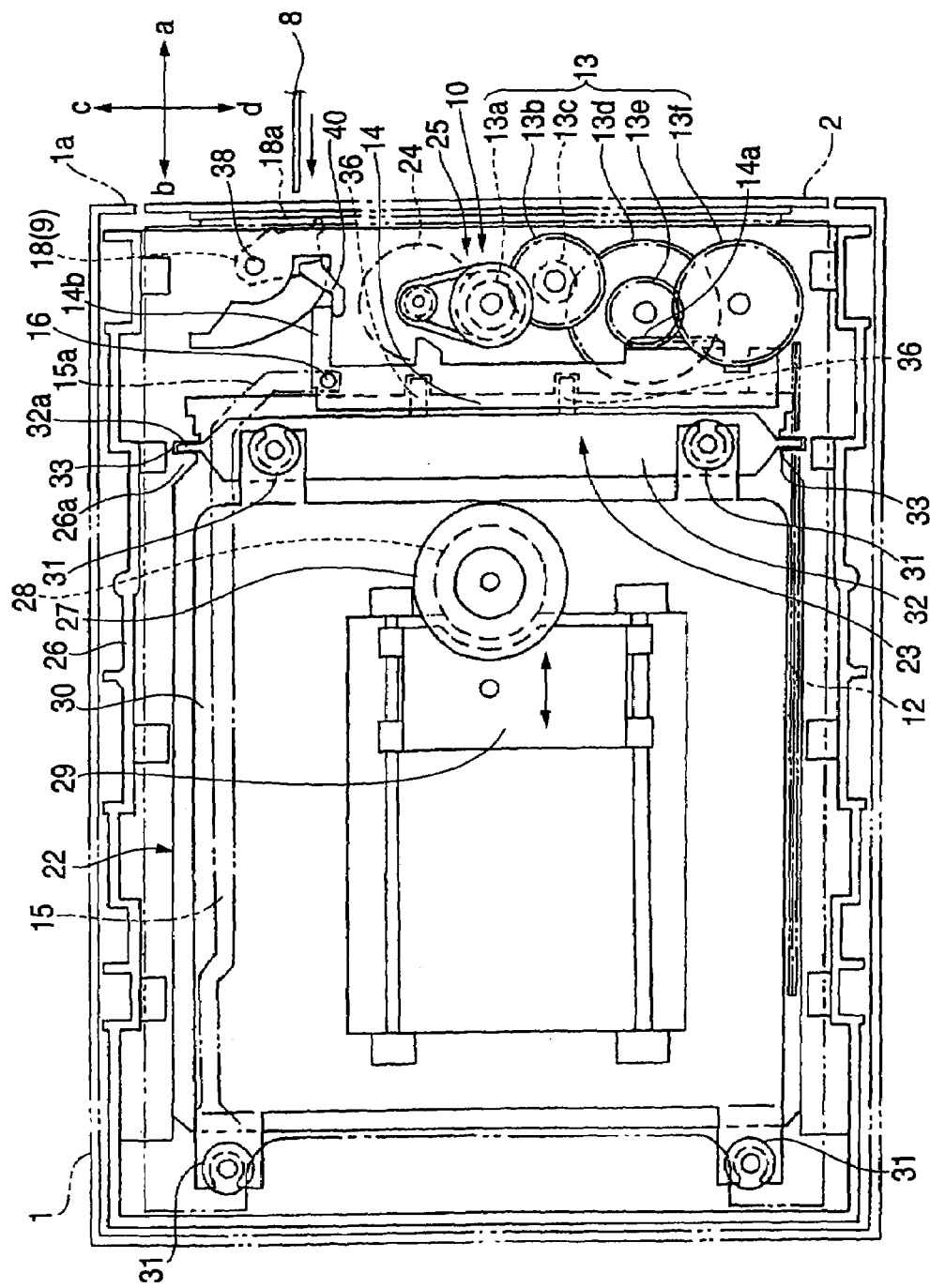
FIG. 1 is a plan view of a disk player according to an embodiment of the present invention.
Figure 2:
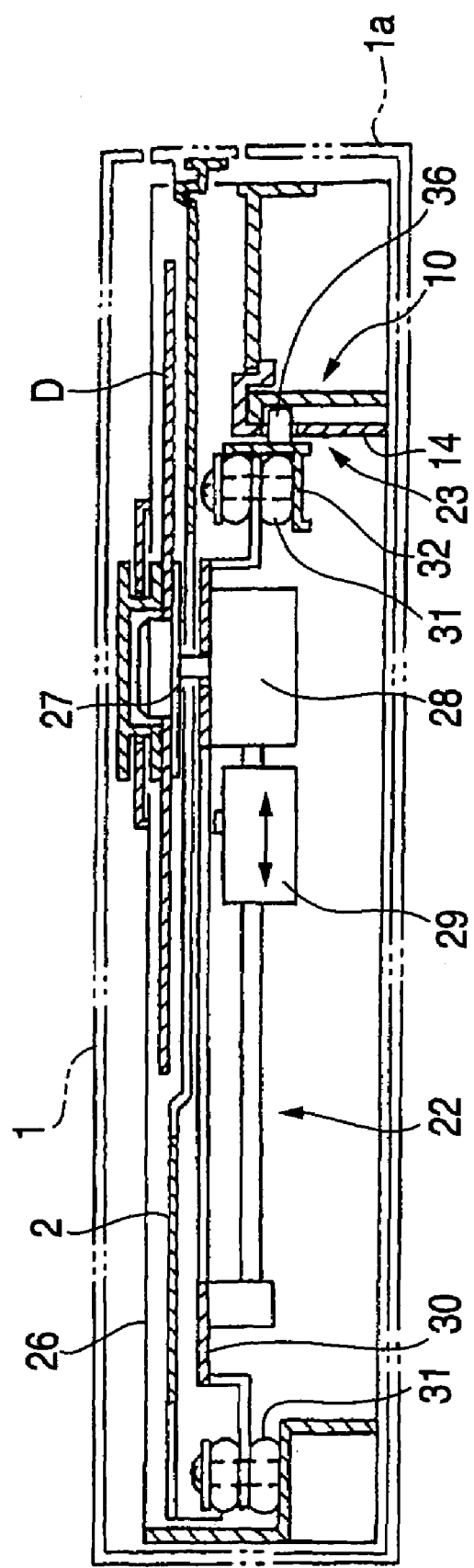
FIG. 2 is a longitudinal sectional view of the disk player according to an embodiment of this invention.
Figure 3:
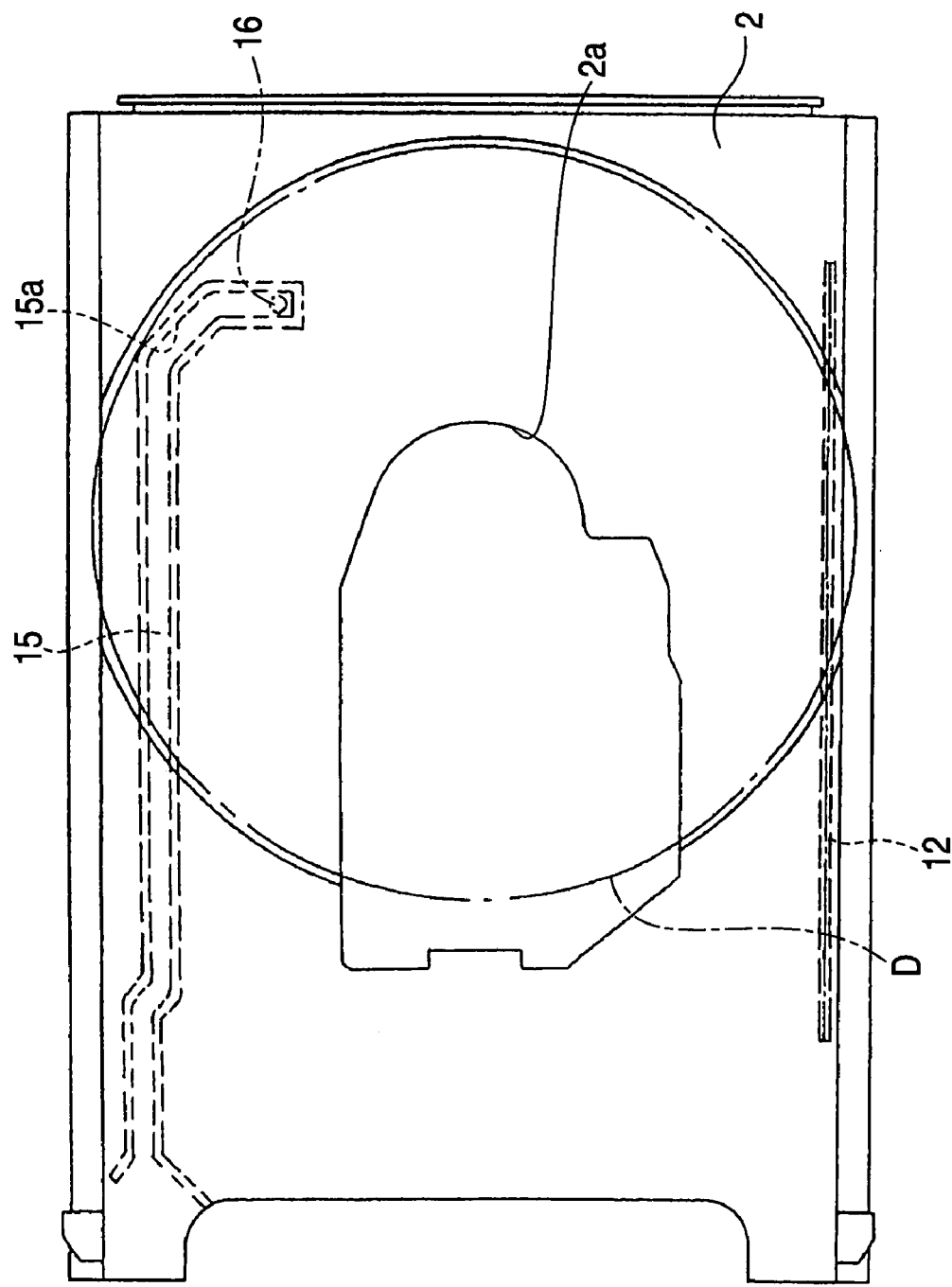
FIG. 3 is a plan view of a tray in the disk player according to an embodiment of this invention.

FIGS. 1 to 3 show a disk player according to an embodiment of the present invention. In this disk player, a touching plate 18 of an emergency mechanism 9 is arranged apart from a gear mechanism 13 and near a front panel 1a of a casing 1 so as to be opposite to the end of a slide bar 14. A nozzle 21, which is located near the thin rod contact face of the touching plate 18, is protruded concentrically to a through-hole 4, integrally protruded from the inner face of the front panel 1a. A driving mechanism 22 is provided for reading the information recorded on a disk D on a tray 2. A cam mechanism 23 is provided for changing the profile of the driving mechanism 22. Other like remaining components refer to like components in FIGS. 12 to 15.

The gear mechanism 13 is composed of first to sixth gears 13a to 13f which are operatively coupled to a driving motor 24 through a pulley/belt 25. The fifth gear 13e is disengageably engaged with a tooth 14a of a slide bar 14. The sixth gear 13f is opposite to a rack 12.

The driving mechanism 22, as shown in FIGS. 1 and 2, includes a base frame 26 and a supporting frame 30 on which a spindle motor 28 equipped with a turn table 27 and an optical pick-up 29 are mounted, which are placed in the casing 1. Both rear ends of the supporting frame 30 are coupled with the rear portion of the base frame 26 through elastic pieces 31, whereas both front ends of the supporting frame 30 are coupled with a lifting frame 32 through elastic pieces 31. Both ends of the lifting frame 32 are movably fit in a groove 33 between supporting pieces 26 integrally protruded from the base frame 26.

Figure 4:
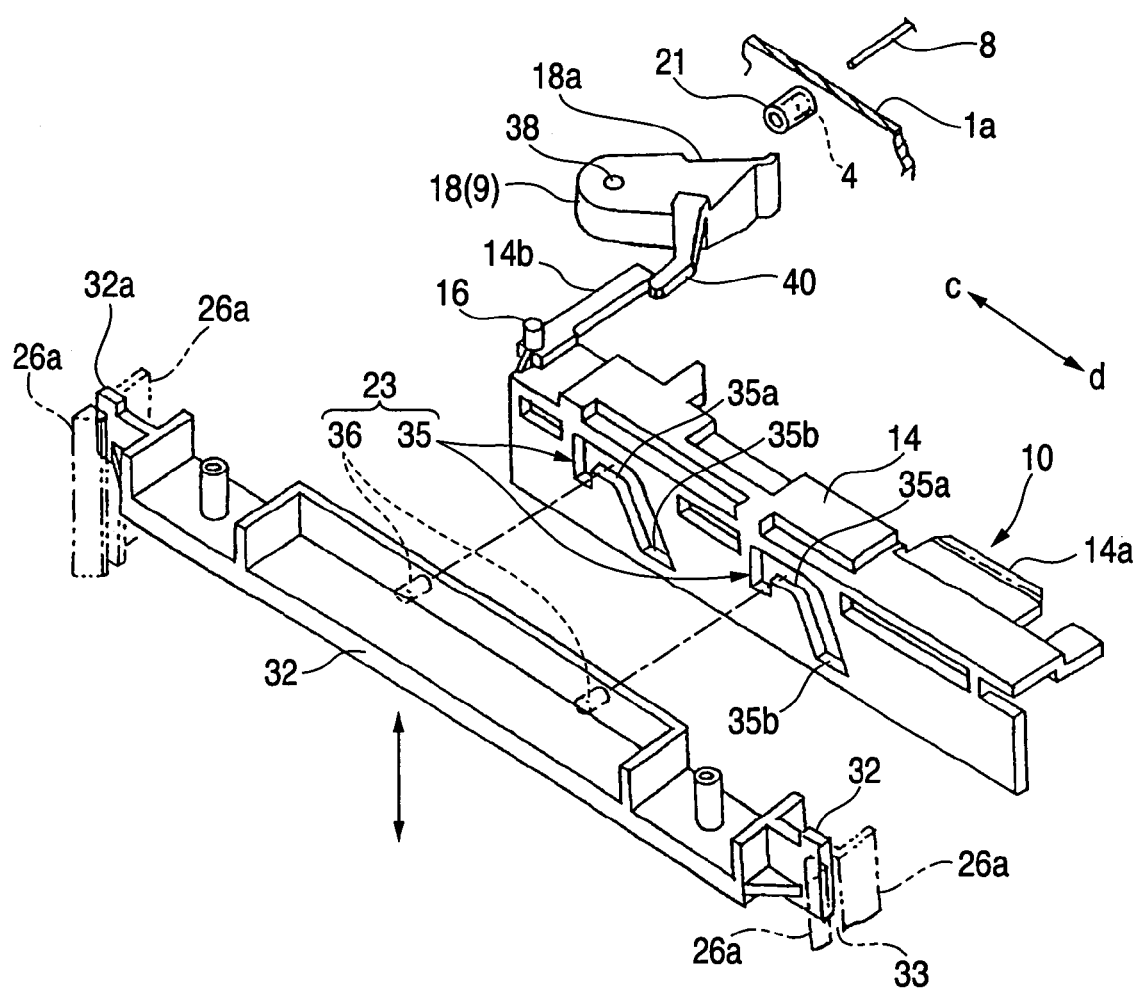
FIG. 4 is an exploded perspective view of the main part of the disk player according to an embodiment of this invention.

The cam mechanism 23, as shown in FIG. 4, includes a pair of cam grooves 35 each having an upper groove portion 35a and a lower groove portion 35b, formed on a side wall of a slide bar 14, and cam pins 36 protruded from the lifting frame 32 and fit in the corresponding cam grooves 35, respectively.

Figure 7A:
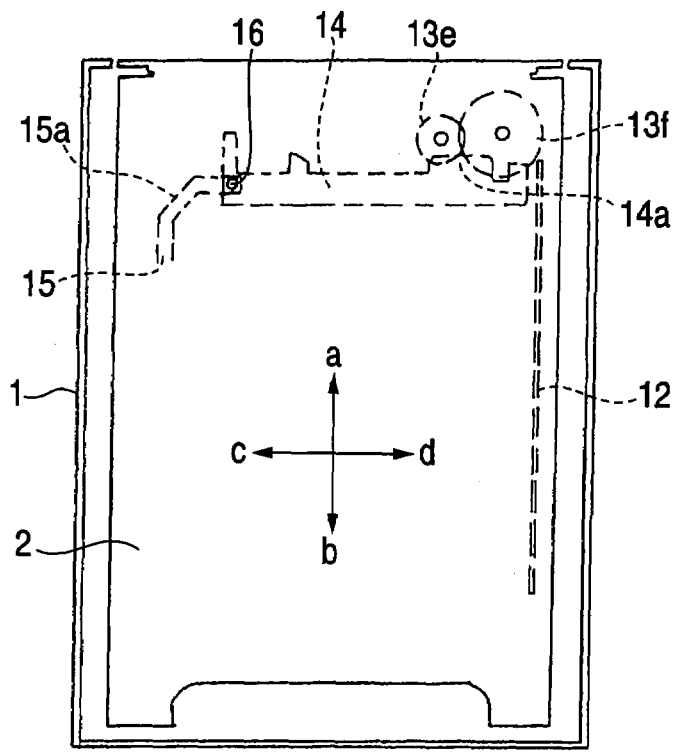
FIGS. 7A and 7B are schematic plan views of the first half of an unloading operation.

In the above configuration, FIGS. 1 and 2 show the state where with the tray 1 housed within the casing 1, a disk D lifted by a turn table 27 is rotated at a high speed to read the information recorded on the disk through an optical pick-up 29. In this state, as shown in FIG. 7A the tooth 14a of the slide bar 14 is engaged with the fifth gear 13e.

Figure 5:
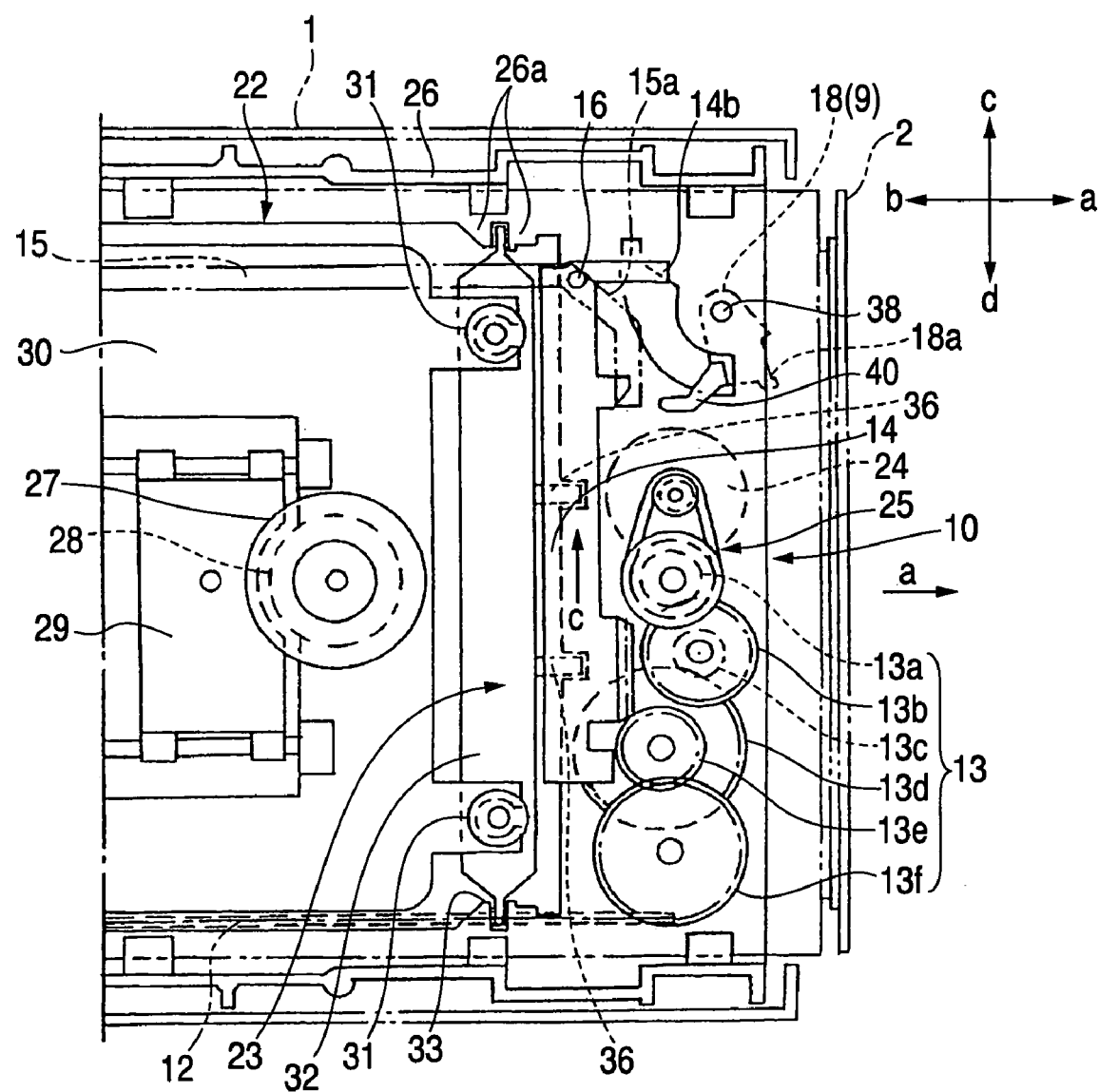
FIG. 5 is a partial plan view in an initial stage of unloading of the disk player according to an embodiment of this invention.
Figure 7B:
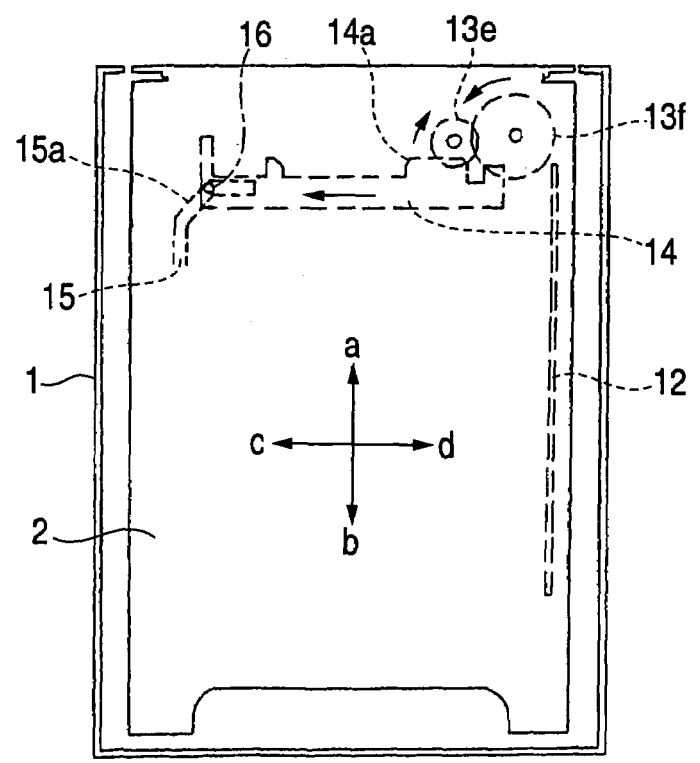

By pressing a loading button 3 (FIG. 12), the driving motor 24 is driven on the basis of an unloading signal so that the slide bar 14 is slid through the gear mechanism 13 and tooth 14a in a direction of arrow c. Then, as shown in FIG. 7B, by pushing the slanted inner face 15a of the guide groove 15 using a guide pin 16, the tray 2 is slightly moved forward "a" so that the rack 12 is engaged with the six gear 13f and the tooth 14a is disengaged from the fifth gear 13e (FIG. 5).

Simultaneously, when the slide bar 14 is slid in a direction of "c", each cam pin 36 is moved from the upper groove portion 35a to the lower groove portion 35b in each cam groove 35 so that the lifting frame 32 is lifted down. Correspondingly, the supporting frame 30 is slanted about both elastic pieces 31 of the rear portion so that the turn table 27 sinks through a central through-hole 2a of the tray. Thus, the disk D on the turn table 27 is delivered to the tray 27 and the tray 2 moving forward "a" does not touch with the turn table 27.

Figure 8:
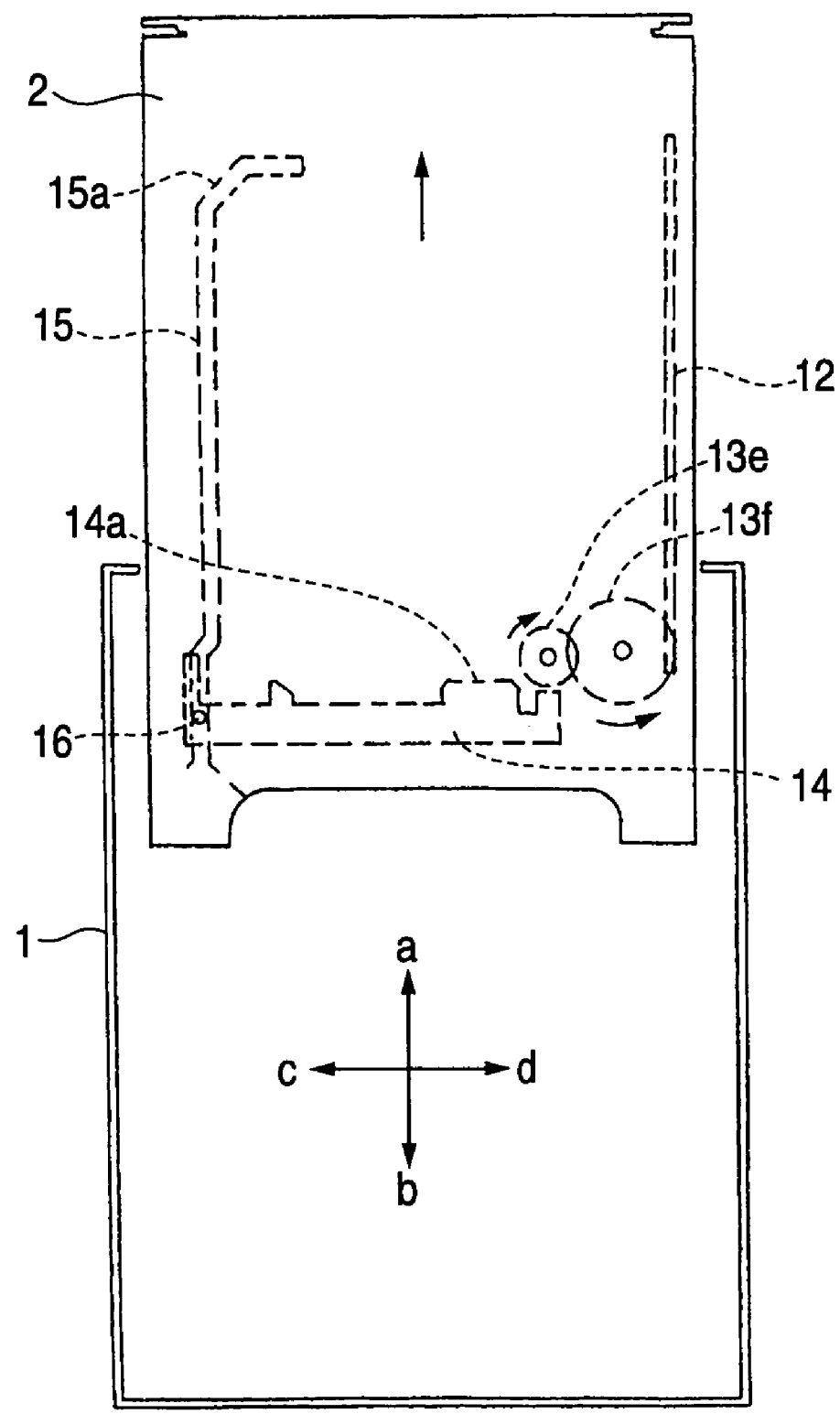
FIG. 8 is a schematic plan view of the latter half of the unloading operation.

Next, as shown in FIG. 8, the tray 2 is moved forward "a" through the rack 12 by rotation of the sixth gear 13f. Thereafter, the disk D is taken out from the tray 2, and a new disk D is placed on the tray 2. By pressing the loading button 3, the driving motor 24 is driven inversely so that the tray 2 is moved backward "b" in the manner opposite to that described above.

Figure 9:
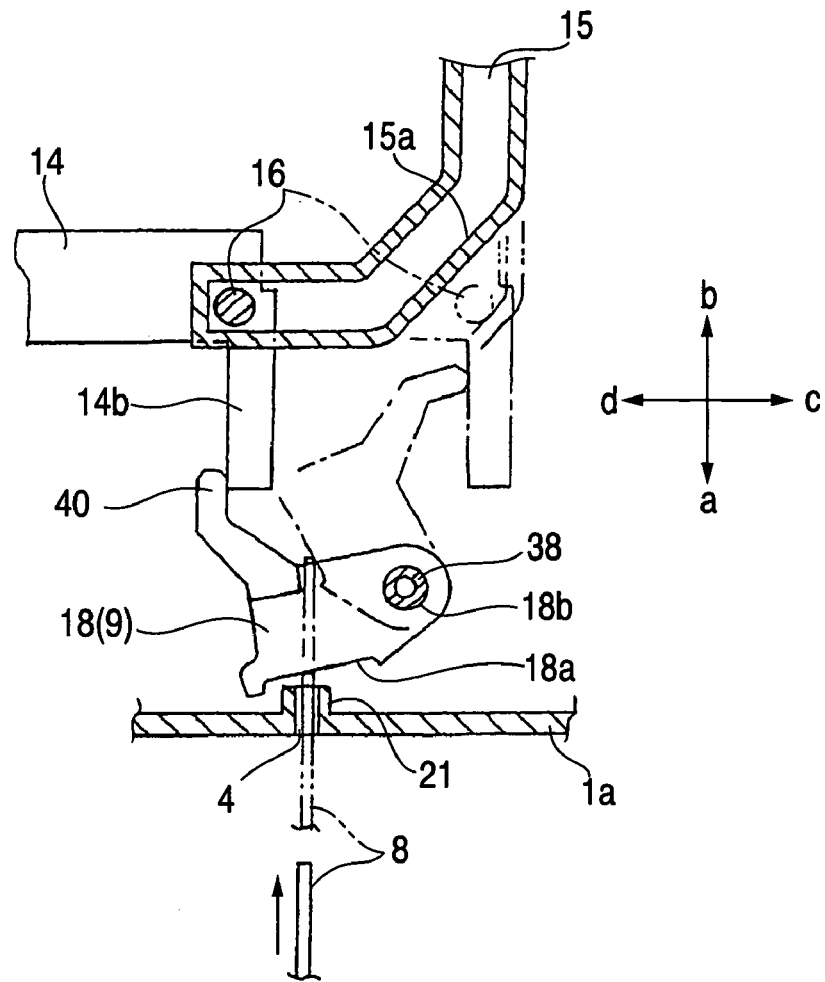
FIG. 9 is a horizontal sectional view of an emergency mechanism.
Figure 10:
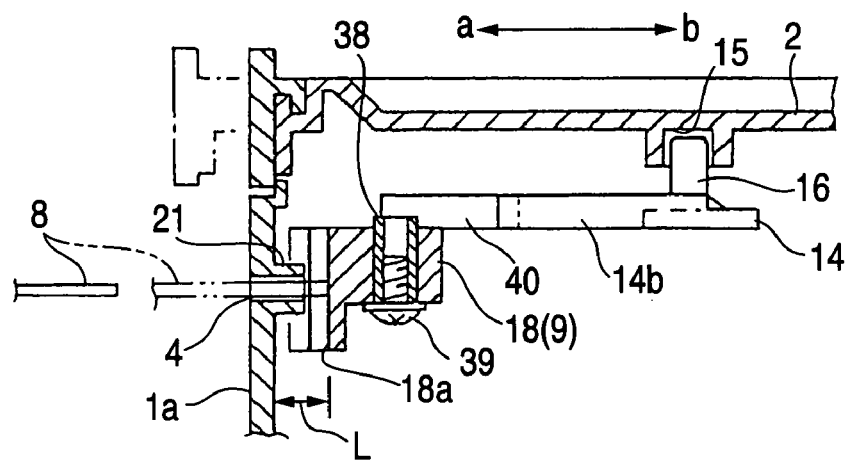
FIG. 10 is a longitudinal sectional view of the emergency mechanism.
Figure 11:
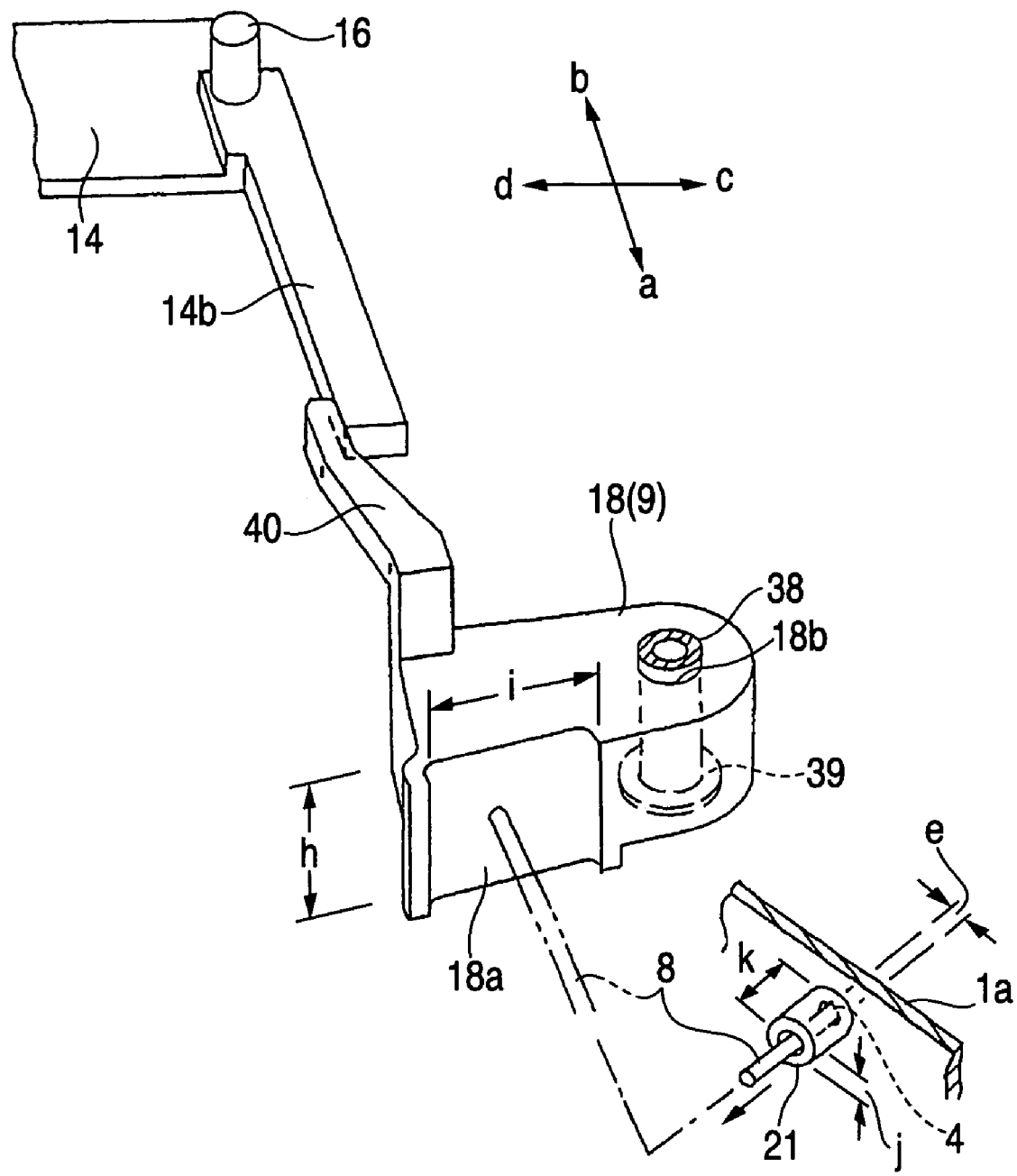
FIG. 11 is an exploded perspective view of the emergency mechanism.
Figure 12:
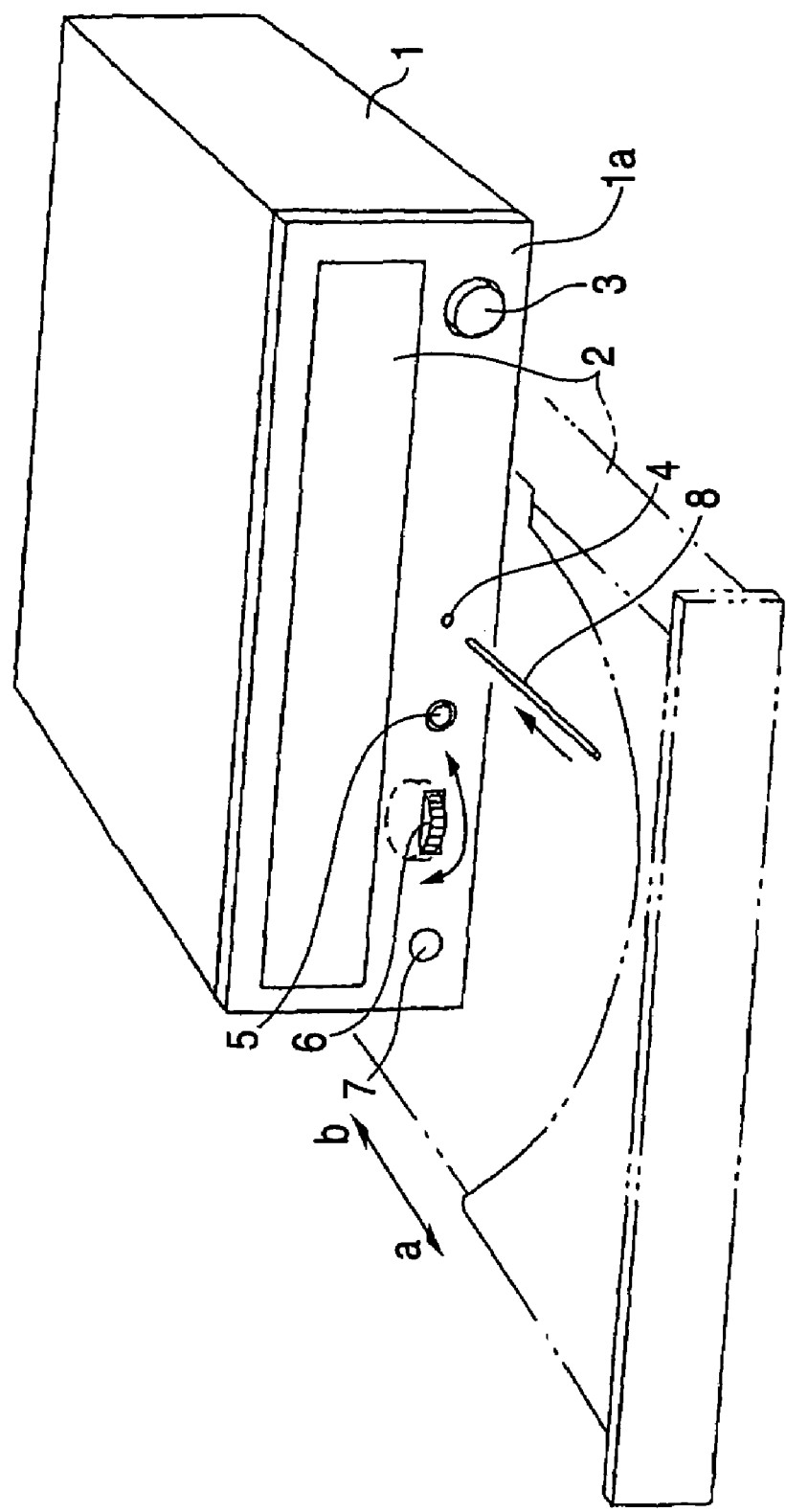
FIG. 12 is a perspective view of a disk player.
Figure 13:
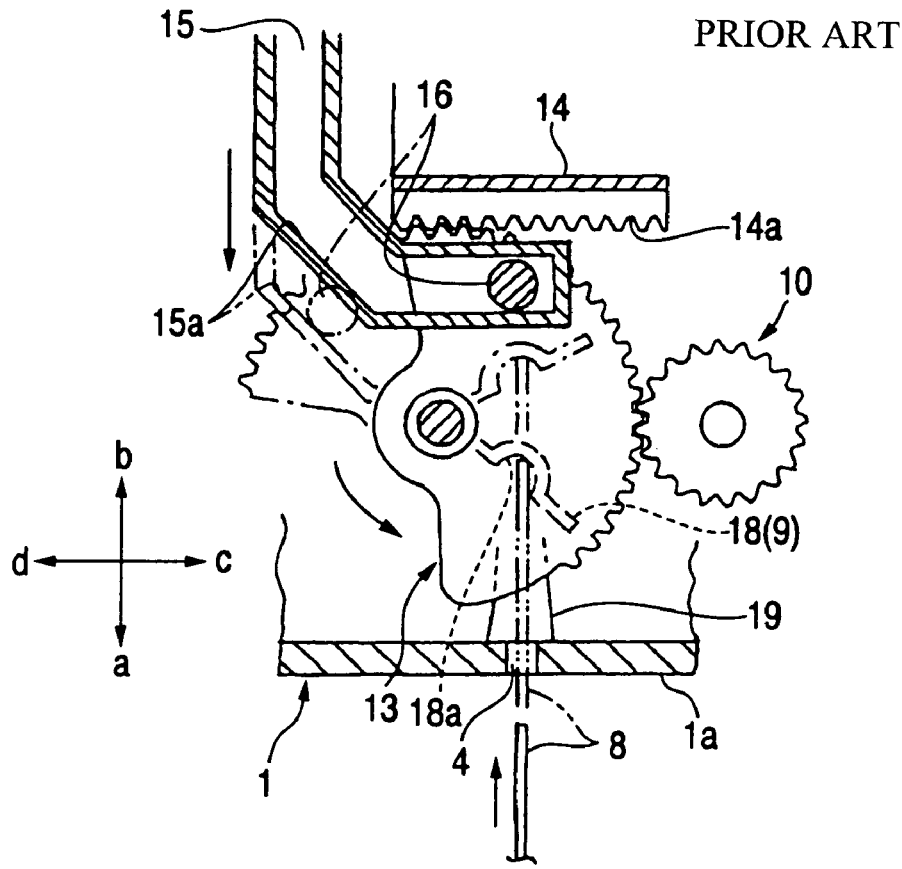
FIG. 13 is a horizontal sectional view of a conventional emergency mechanism.
Figure 14:
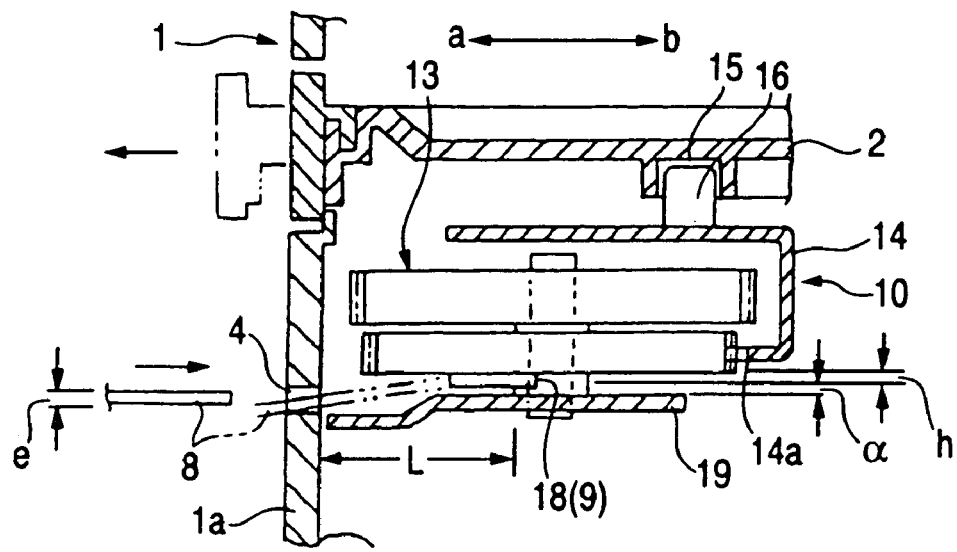
FIG. 14 is a longitudinal sectional view of the conventional emergency mechanism.

The touching plate 18 of the emergency mechanism 9, as shown in FIGS. 9 to 11, is rotatably pivoted about a pivoting axis 38 in such a manner that the pivoting axis 38 protruded from the base frame 26 is fit in a through-hole 18b made in the base of the touching plate 18 and a stopper 39 is engaged with the pivoting shaft 38. An arm 40 is protruded from the tip of the touching plate 18 so that it is opposite to a lever 14b protruded from the end of the slide bar 14.

The longitudinal width h and transverse width i of a thin rod contact face 18a concaved from the front face at the tip of the touching plate 18 are set at the magnitudes five times larger than the external diameter e of the thin rod 8. The inner diameter of the nozzle 21 is set at a magnitude slightly larger than the external diameter e of the thin rod 8. Examples of the concrete dimensions are as follows. The external diameter e of the thin rod 8 is 0.8 mm; the longitudinal width h and the transverse with i of the thin rod contact face 18a are 6 mm, respectively; the inner diameter j of the nozzle 21 is 1 mm and the protruding length k of the nozzle 21 is 2–5 mm.

In the configuration, if the tray 2 cannot be moved forward "a" even when pressing the button 3, the thin rod 8 passed through the through-hole 4 is guided by the nozzle 21 so that the tip 8 of the thin rod 8 is brought into contact with the thin rod contact face 18a of the touching plate 18. In this way, by pushing in the touching plate 18 about the pivoting shaft 38, as indicated by phantom line in FIG. 9, the slide bar 14 is slid in a direction of arrow "c" through the arm 40 and lever 14b so that the guide pin 16 pushes the slanted inner face 15a of the guide groove 15, thereby slightly moving the tray 2 forward "a" (see phantom line in FIG. 10). Thereafter, the front end of the tray may be pulled out with a finger.

Figure 15:
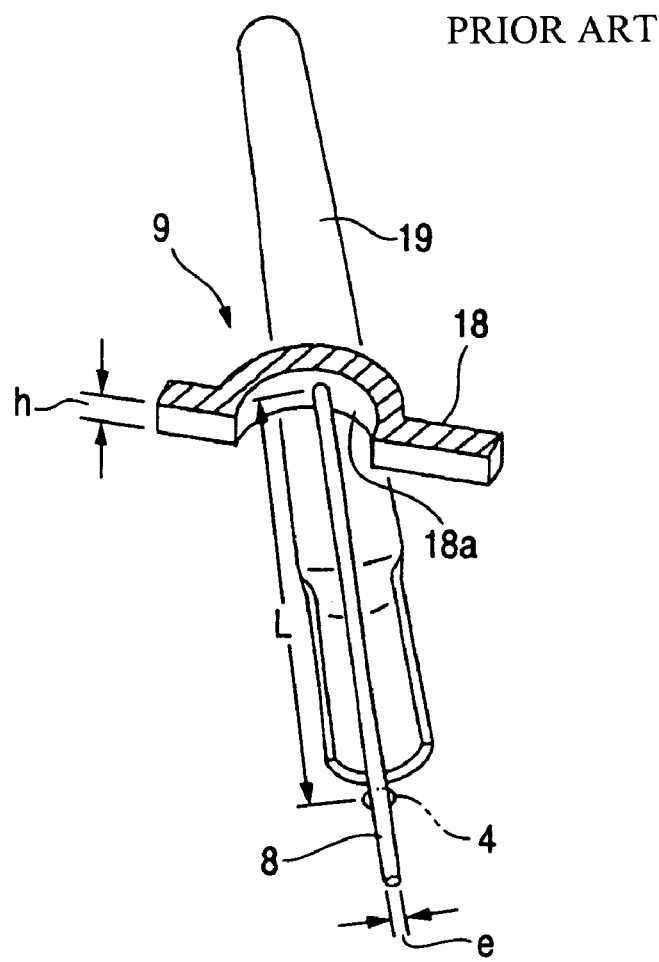
FIG. 15 is a perspective view of the main part of the conventional emergency mechanism.
Figure 16:
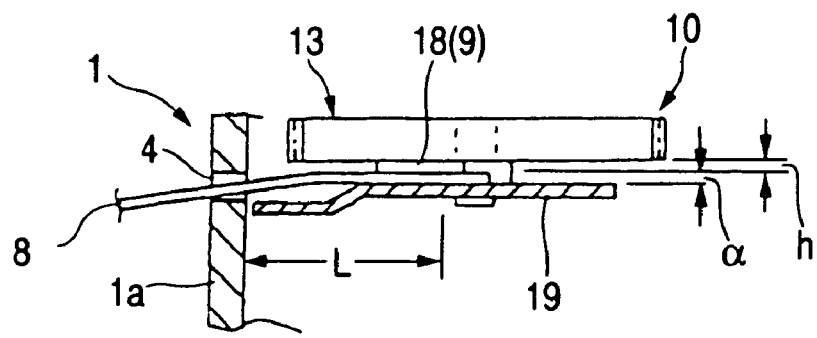
FIG. 16 is a longitudinal sectional view showing an unsuccessful result of the conventional emergency mechanism.

In accordance with the configuration described above, since the touching plate 18 of the emergency mechanism 9 is arranged near the front panel of the casing 1 so that the distance L (FIG. 10) from the through-hole 4 in the front panel 1a to the thin rod contact face 18a of the touching plate 18 is short, the tip of the thin rod 8 passed through the through-hole 4 can be accurately opposed to the thin rod contact face 18a. In addition, since the nozzle 21 having a prescribed length k which is located near the thin rod contact face 18a is protruded, concentrically to the through-hole 4, integrally from the inner face of the front panel 1a, the thin rod 8 passed through the through-hole 4 can be guided by the nozzle 21 so that it is surely brought into contact with the thin rod contact face 18a of the touching plate 18. Thus, the emergency mechanism 9 can be smoothly operated to move the tray forward "a" slightly. In this case, since the nozzle 21 is protruded integrally from the front panel 1a, the number of components is not increased, thereby reducing the production cost as compared with the case of using the conventional guiding plate 19 (FIG. 15).

Since the touching plate 18 is located in a relatively wide space apart from the gear mechanism 13 so that the longitudinal width h and transverse width i of the thin rod contact face 18a are set at the magnitudes five times larger than the external diameter e of the thin rod 8, even if the direction of the tip of the thin rod 8 gone out from the nozzle 21 is slightly changed, the tip of the thin rod 8 can be surely brought into contact with the thin rod contact face 18a.

In accordance with the invention described in the first aspect, as illustrated in the embodiment (FIGS. 1 to 11), since the touching plate of the emergency mechanism is arranged near the front panel of the casing so that the distance from the through-hole in the front panel to the thin rod contact face of the touching plate is short, the tip of the thin rod passed through the through-hole can be accurately opposed to the thin rod contact face. In addition, since the nozzle having a prescribed length which is located near the thin rod contact face is protruded, concentrically to the through-hole, integrally from the inner face of the front panel, the thin rod passed through the through-hole can be guided by the nozzle so that it is surely brought into contact with the thin rod contact face of the touching plate. Thus, the emergency mechanism can be smoothly operated to move the tray forward "a" slightly. In this case, since the nozzle is protruded integrally from the front panel, the number of components is not increased, thereby reducing the production cost as compared with the case of using the conventional guiding plate.

Since the touching plate is located in a relatively wide space apart from the gear mechanism so that the longitudinal width and transverse width of the thin rod contact face are set at the magnitudes five times larger than the external diameter e of the thin rod, even if the direction of the tip of the thin rod gone out from the nozzle is slightly changed, the tip of the thin rod can be surely brought into contact with the thin rod contact face.

In accordance with the invention described in the second aspect, since the touching plate of the emergency mechanism is arranged near the front panel of the casing so that the distance from the through-hole in the front panel to the thin rod contact face of the touching plate is short, the tip of the thin rod passed through the through-hole can be accurately opposed to the thin rod contact face. In addition, since the nozzle having a prescribed length which is located near the thin rod contact face is protruded, concentrically to the through-hole, integrally from the inner face of the front panel, the thin rod passed through the through-hole can be guided by the nozzle so that it is surely brought into contact with the thin rod contact face of the touching plate. Thus, the emergency mechanism can be smoothly operated to move the tray forward "a" slightly. In this case, since the nozzle is protruded integrally from the front panel, the number of components is not increased, thereby reducing the production cost as compared with the case of using the conventional guiding plate.

In accordance with the invention described in the third aspect, since the touching plate is located in a relatively wide space apart from the gear mechanism so that the longitudinal width and transverse width of the thin rod contact face are set at the magnitudes five times larger than the external diameter e of the thin rod, even if the direction of the tip of the thin rod gone out from the nozzle is slightly changed, the tip of the thin rod can be surely brought into contact with the thin rod contact face.

What is claimed is:

1. A disk player comprising:
 a tray driving device for moving a tray placed in a casing forward/backward; and
 an emergency mechanism for slightly moving the tray forward by a manual operation using a thin rod, wherein:
 the tray driving device includes
  a gear mechanism provided on a front portion of the casing oppositely to a rack provided on a lower surface of the tray,
  a slide bar arranged, on the front portion of the casing, slidably in a transverse direction orthogonal to the direction of moving the tray forward/backward,
  a guide pin projecting from the slide bar and fitting in a guide groove formed in the lower surface of the tray, and
  a tooth portion formed integrally to the slide bar so as to be engageable/disengageable with the gear mechanism, wherein the gear mechanism is driven on the basis of an unloading signal so that the slide bar is slid through the tooth portion engaged with the gear mechanism in a prescribed direction, and by pushing a slanted inner face of the guide groove using the guide pin, the tray is slightly moved forward so that the rack is engaged with the gear mechanism and the tooth portion is disengaged from the gear portion, thereby moving the tray forward through driving of the gear mechanism;
 the emergency mechanism includes
  a touching plate incorporated in the gear mechanism,
  a through-hole made, oppositely to the touching plate, in a front panel of the casing, and
  a guide plate extending from the vicinity of the through-hole to the touching plate, wherein a thin rod passed through the through-hole is guided by the guide plate so that the thin rod is brought into contact with a thin rod contact face of the touching plate, and by pushing in the touching plate, the slide bar is slid in the prescribed direction through the gear mechanism and tooth portion, thereby slightly moving the tray forward;
 the touching plate of the emergency mechanism is extracted from the gear mechanism, located near the front panel of the casing and rotatably pivoted on a pivoting axis to the casing;
 the longitudinal width and transverse width of the thin rod contact face of the touching plate are set at the magnitudes five times larger than the external diameter of the thin rod;
 an arm is protruded from the touching plate so as to be opposite to a lever protruded from the end of the slide bar;
 a nozzle is arranged in place of the guide plate to be near the thin rod contact face of the touching plate, the nozzle being protruded concentrically to the through-hole, integrally protruded from the inner face of the front panel, the nozzle having a prescribed length; and
 the thin rod passed through the through-hole is guided by the nozzle so that the tip of the thin rod is brought into contact with the thin rod contact face of the touching plate, and by pushing in the touching plate about the pivoting axis, the slide bar is slid in the prescribed direction through the arm and lever, thereby slightly moving the tray forward.

2. A disk player comprising:

a tray driving device for moving a tray placed in a casing forward/backward; and an emergency mechanism for slightly moving the tray forward by a manual operation using a thin rod, wherein:

the tray driving device includes a gear mechanism provided on a front portion of the casing oppositely to a rack provided on a lower surface of the tray, a slide bar arranged, on the front portion of the casing, slidably in a transverse direction orthogonal to the direction of moving the tray forward/backward, a guide pin projecting from the slide bar and fitting in a guide groove formed in the lower surface of the tray, and a tooth portion formed integrally to the slide bar so as to be engageable/disengageable with the gear mechanism, wherein the gear mechanism is driven on the basis of an unloading signal so that the slide bar is slid through the tooth portion engaged with the gear mechanism in a prescribed direction, and by pushing a slanted inner face of the guide groove using the guide pin, the tray is slightly moved forward so that the rack is engaged with the gear mechanism and the tooth portion is disengaged from the gear portion, thereby moving the tray forward through driving of the gear mechanism;

the emergency mechanism includes a touching plate located near a front panel of the casing and rotatably pivoted about a pivoting axis on the casing;

an arm is protruded from the touching plate so as to be opposite to a lever protruded from the end of the slide bar;

a nozzle is arranged in place of the guide plate to be near a thin rod contact face of the touching plate, the nozzle being protruded concentrically to the through-hole, integrally protruded from the inner face of the front panel, the nozzle having a prescribed length; and the thin rod passed through the through-hole is guided by the nozzle so that the tip of the thin rod is brought into contact with the thin rod contact face of the touching plate, and by pushing in the touching plate about the pivoting axis, the slide bar is slid in the prescribed direction through the arm and lever, thereby slightly moving the tray forward.

3. The disk player according to claim 2, wherein the longitudinal width and transverse width of the thin rod contact face of the touching plate are set at the magnitudes five times larger than the external diameter of the thin rod.

\* \* \* \* \*